United States Patent [19]

Skwirut et al.

[11] 4,315,192
[45] Feb. 9, 1982

[54] FLUORESCENT LAMP USING HIGH PERFORMANCE PHOSPHOR BLEND WHICH IS PROTECTED FROM COLOR SHIFTS BY A VERY THIN OVERCOAT OF STABLE PHOSPHOR OF SIMILAR CHROMATICITY

[75] Inventors: Henry Skwirut, Verona; Robert G. Young, Nutley, both of N.J.

[73] Assignee: Westinghouse Electric Corp., Pittsburgh, Pa.

[21] Appl. No.: 108,269

[22] Filed: Dec. 31, 1979

[51] Int. Cl.³ ............................................. H01J 61/48
[52] U.S. Cl. ................................................... 313/487
[58] Field of Search ............................... 313/487, 220

[56] References Cited

U.S. PATENT DOCUMENTS

| | | |
|---|---|---|
| 2,488,733 | 11/1949 | McKeag et al. |
| 3,602,758 | 8/1971 | Thornton et al. |
| 3,858,082 | 12/1974 | Thornton, Jr. ...................... 313/487 |
| 3,937,998 | 2/1976 | Verstegen et al. ................... 313/487 |
| 4,070,598 | 1/1978 | DeLuca et al. ...................... 313/487 |
| 4,088,923 | 5/1978 | Manders .............................. 313/487 |

Primary Examiner—Stanley T. Krawczewicz
Attorney, Agent, or Firm—W. D. Palmer

[57] ABSTRACT

Fluorescent lamps have a predetermined correlated color temperature and a combined efficiency and good color rendition of illuminated objects. The lamps utilize a two-layer phosphor coating comprising a layer coated onto the envelope interior surface and formed of a very high performance three-component blend which includes a blue-emitting phosphor, a green-emitting manganese-activated zinc silicate phosphor, and a red-orange emitting phosphor, all mixed in predetermined amounts and relative proportions to provide an emission of approximate predetermined x-y coordinates. Under some conditions, the phosphor blend when used as a single layer is subject to depreciation of the light output of the green component, particularly in the vicinity of the lamp electrodes which results in color shifts which are objectionable from an aesthetic standpoint. To protect the green-emitting component of the high performance blend, there is provided over the phosphor blend layer a very thin layer of finely divided phosphor which is very stable and which has an emission of approximately the same x-y coordinates as the high performance phosphor blend layer. The resulting lamp has overall improved performance from an aesthetic standpoint.

8 Claims, 6 Drawing Figures

FLUORESCENT LAMP USING HIGH PERFORMANCE PHOSPHOR BLEND WHICH IS PROTECTED FROM COLOR SHIFTS BY A VERY THIN OVERCOAT OF STABLE PHOSPHOR OF SIMILAR CHROMATICITY

CROSS REFERENCE TO RELATED APPLICATION

In copending application Ser. No. 109,008, filed concurrently herewith, by Eugene A. Graff and Jacob Van Broekhoven, is disclosed an improved fluorescent lamp which utilizes a three-component high-performance phosphor blend which is subject to color shifts. To provide the dual function of decreasing the amount of the expensive high-performance blend and also to screen against possible color shifts which might occur in the high-performance blend, without appreciably affecting overall lamp performance, there is provided a phosphor undercoat next to the envelope which not only is less expensive but which in itself has both good color rendering properties and efficacy, in order to decrease lamp costs and to screen possible color shifts.

BACKGROUND OF THE INVENTION

This invention generally relates to fluorescent lamps and, more particularly, to an improved fluorescent lamp of predetermined chromaticity which has combined high efficacy and good color rendition for illuminated objects and which is protected from color shifts.

U.S. Pat. No. 3,858,082, dated Dec. 3, 1974 to Thornton discloses various three-component phosphor blends which can be used in fluorescent lamps in order to provide both good color rendition of illuminated objects and a high light output. On embodiment of a phosphor blend which is disclosed in this patent utilizes apatite-structured strontium chlorophosphate activated by divalent europium as a blue-emitting phosphor component, manganese-activated zinc silicate phosphor as a green-emitting phosphor component and yttrium oxide activated by trivalent europium as a red-orange emitting phosphor component. The relative proportions of these components can be varied to provide the lamp with a predetermined correlated color temperature which can vary over a wide range, and lamp correlated color temperatures which vary from 3000° K. to 6500° K. are readily obtainable. The overall performance of such lamps is excellent, but on occasion the green-emitting phosphor component displays a relatively rapid depreciation of light output, particularly in the vicinity of the electrodes, which causes a color shift to occur. Although this normally does not affect the overall performance of the lamps, it is considered objectionable from an aesthetic standpoint.

U.S. Pat. No. 3,937,998, dated Feb. 10, 1976 to Verstegen et al. discloses a three-component phosphor blend for use in fluorescent lamps, in order to provide both good color rendition of illuminated objects and a high light output. The components comprising this phosphor blend are very expensive and to decrease the amount of these expensive components needed, there is disclosed in U.S. Pat. No. 4,088,923, dated May 9, 1978 to Manders an underlayer of relatively inexpensive halophosphate phosphor of the same emission color, so that the expensive phosphor blend components are "worked harder", and less material is required. A two layer phosphor coating is also disclosed in U.S. Pat. No. 3,602,758 dated Aug. 31, 1971 to Thornton et al.

In copending Application Ser. No. 58,574, now U.S. Pat. No. 4,263,530, filed July 17, 1979 by J. Van Broekhoven and R. Corth, and owned by the present assignee, is disclosed a fluorescent lamp which incorporates a phosphor blend of warm-white color which comprises a mixture of apatite-structured calcium fluorophosphate activated by antimony and manganese and yttrium oxide activated by trivalent europium. The resulting lamp has both improved output and color rendering index as well as improved color preference index as compared to a standard fluorescent lamp which incorporates a halophosphate phosphor of the same color temperature.

The so-called halophosphate phosphors have been the standard phosphor used in fluorescent lamps for many years and the basic patent describing these phosphors in U.S. Pat. No. 2,488,733, dated Nov. 22, 1949, to McKeag et al. Such phosphors are normally fabricated as apatite-structured calcium fluorochlorophosphate, activated by antimony or antimony plus manganese, preferably with a small addition of cadmium.

The internationally accepted procedure for standardizing and measuring the color rendering properties of light sources is set forth in the publication of The International Commission on Illumination, identified as Publication CIE No. 13(E-1.3.2) 1965. More recently, a color-preference index has been proposed for rating the performance of light sources in accordance with what the normal observer considers to be the preferred coloration for familiar objects. This color preference index (CPI) is summarized in the Journal of the Illuminating Engineering Society, pages 48–52 (October 1974) article entitled "A Validation of the Color-Preference Index" by W. A. Thornton.

SUMMARY OF THE INVENTION

The present fluorescent lamp has a predetermined correlated color temperature as defined by the x-y coordinates as inscribed on the x-y chromaticity diagram of the ICI system, together with combined high efficacy and good color rendition. The basic lamp comprises a sealed elongated light-transmitting envelope having electrodes operatively positioned therein proximate the ends thereof and enclosing a discharge-sustaining filling comprising mercury and a small charge of inert ionizable starting gas which when energized generates a discharge comprising ultraviolet radiations and a limited proportion of visible radiations. A phosphor means comprising a predetermined amount of a first phosphor layer is carried on the inner surface of the envelope and a predetermined amount of a second phosphor layer is coated on and carried on the first phosphor layer so that the second phosphor layer is positioned nearest to the discharge. Preferably the first phosphor layer principally comprises a mixture of predetermined amounts and relative proportions of narrow-band blue-emitting phosphor activated by divalent europium having an emission substantially confined to the wavelength range of from 430 nm to 485 nm, green-emitting manganese-activated zinc silicate phosphor having an emission substantially confined to the wavelength range of from 515 nm to 570 nm, and red-orange-emitting trivalent europium-activated yttrium oxide phosphor having an emission substantially confined to the wavelength range of from 588 nm to 630 nm. The predetermined amounts and relative proportions of the mixed phosphors which comprise the first layer are such that the composite emission response from the first phosphor layer, when excited by the discharge, falls approximately within a predetermined color ellipse on the x-y chromaticity diagram of the ICI system, and the coating weight of the first phosphor layer falls within the range of from 2.3 mg/cm$^2$ to 5.5 mg/cm$^2$.

It has been found that if such a three-component blend is used as a single phosphor layer in a lamp, portions of the green-emitting phosphor component can display a maintenance of light emission during lamp operation which is inferior to the maintenance of light emission displayed by the blue-emitting phosphor component and the red-emitting phosphor component of the blend.

The second phosphor layer principally comprises a relatively thin layer of stable, finely divided phosphor means, which when excited by the discharge has an emission of predetermined x-y coordinates which substantially correspond to the predetermined x-y coordinates of the composite emission of the first phosphor layer. The second phosphor layer is quite thin and the coating weight falls within the range of from 0.23 mg/cm$^2$ to 0.7 mg/cm$^2$. The composite emissions of the first phosphor layer and the second phosphor layer coupled with the limited proportion of visible radiations generated by the discharge cause the total visible emissions from the energized lamp to have predetermined x-y coordinates which fall within a predetermined color ellipse as inscribed on the x-y chromaticity diagram of the ICI system. In this manner, all components of the first phosphor layer are screened and protected from direct exposure to the discharge as well as possible contamination from the electrode structures, in order to protect against color shifts, particularly at the end portions of the envelope.

BRIEF DESCRIPTION OF THE DRAWINGS

For better understanding of the invention, reference may be had to the preferred embodiment, exemplary of the invention, shown in the accompanying drawings, in which.

DESCRIPTION OF THE PREFERRED EMBODIMENTS

Figure 1:
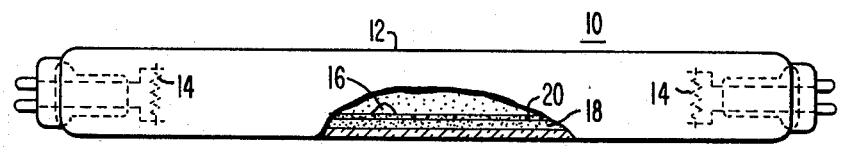
FIG. 1 is an elevational view, partly broken away, of a fluorescent lamp which incorporates the present combined double layer phosphor.

With specific reference to the form of the invention illustrated in the drawings, the lamp 10 as shown in FIG. 1 is generally conventional and comprises a sealed, elongated, light-transmitting envelope 12 having electrodes 14 operatively positioned therein proximate the ends thereof and enclosing a discharge-sustaining filling comprising mercury 16 and a small charge of inert ionizable starting gas, such as a few torrs of argon or mixed argon and neon, for example. When the lamp is energized, the resulting low-pressure mercury discharge generates ultraviolet radiations and a limited proportion of visible radiations, with the latter constituting a strong mercury line at 436 nm, a relatively strong green line at 546 nm, and a relatively weak line at 578 nm, with the composite mercury emission appearing blue to the eye.

Coated on the inner surface of the envelope is a phosphor means comprising a predetermined amount of a first phosphor layer 18 carried on the inner surface of the envelope 12 and a predetermined amount of a second phosphor layer 20 coated on and carried on the first phosphor layer 18 so that the second phosphor layer 20 is positioned nearest to the discharge of the operating lamp.

The first phosphor layer 18 which is coated onto the interior surface of the bulb 12 comprises a mixture of predetermined amounts and relative proportions of three different phosphor materials each having emissions substantially confined to different regions of the visible spectrum so that the composite emission from this mixture is a gapped or non-continuous emission, with the outputs of the components concentrated in those regions of the visible spectrum where the visual system responds most efficiently, at least according to the latest theories of vision. The first component of the blend is a narrow-band blue-emitting, or blue-violet-emitting, phosphor activated by divalent europium and having an emission substantially confined to the wavelength range of from 430 nm to 485 nm. The preferred phosphor is strontium chlorophosphate activated by divalent europium and such a phoshor is described in detail in U.S. Pat. No. 4,038,204 dated July 26, 1977 to Wachtel. A typical particle size for this phosphor is about 10 microns. As an alternative to the preferred blue-emitting phosphor, barium and/or strontium aluminate activated by divalent europium may be substituted therefor and such a phosphor is described in detail in U.S. Pat. No. 3,937,998, dated Feb. 10, 1976 to Verstegen et al.

The second component of the first phosphor layer is zinc silicate activated by manganese and such a phosphor has been used in fluorescent lamps for many years. As an example for preparing the phosphor, 700 grams zinc oxide are mixed with 300 grams silica, 30 grams manganous carbonate, 2 grams plumbous fluoride and 0.01 gram arsenic oxide. The raw mix is fired in air for about three hours at a temperature of about 1300° C. in covered trays. Such a phosphor has a green emission which is substantially confined to the wavelength range of from 515 nm to 570 nm. A typical particle size for this phosphor is about 7.5 microns. The third phosphor component is a red-orange-emitting yttrium oxide activated by a trivalent europium which has an emission substantially confined to the wavelength range of from 588 nm to 630 nm. Such a phosphor is readily prepared by mixing yttrium oxide and europium oxide in the desired gram mole ratios as desired in the final phosphor, together with from 5% to 30% by weight of zinc chloride as a flux, with a preferred flux addition being from 10% to 20% by weight of the phosphor constituents. These constituents are fired at from 1250° C. to 1400° C., with 1350° C. being preferred, for a period of from three hours to twenty hours, with twelve hours being preferred. The phosphor can be expressed by the formula $(Y_{1-x} Eu_x)_2 O_3$, wherein x is from 0.03 to 0.2 with the preferred value of x being 0.09. In the final phosphor, the europium constitutes from 2% to 13% by weight of the phosphor with about 6% by weight being preferred. A typical particle size for this phosphor is about 7 microns.

As used in a fluorescent lamp, the foregoing three-component blend can be controlled with respect to the emission color of the blend by varying the relative proportions of the three components, as will be explained hereinafter. If the three component blend comprising the phosphor layer 18 were to be used as a single coating, it would normally be coated to a weight of about 4.7 mg/cm$^2$. In a 40WT12 bulb, this would constitute about 6 grams of phosphor.

The performance of the fluorescent lamps which incorporate the foregoing three component blend as a single layer of mixed phosphor is excellent, particularly with respect to color rendition of illuminated objects and perceived brightness, and commercial embodiments of fluorescent lamps incorporating such a phosphor blend are an outstanding commercial success. In some instances, however, the zinc silicate phosphor component of the blend has displayed a relatively rapid decrease in light output during prolonged operation of the lamp at those portions of the phosphor coating which are proximate the lamp electrodes. As a result, during such prolonged operation, in some instances, the end portions of the lamps have shifted to a pinkish appearance. While this does not affect the overall performance of the lamp, it has been considered objectionable in some instances from an aesthetic standpoint.

Figure 2:
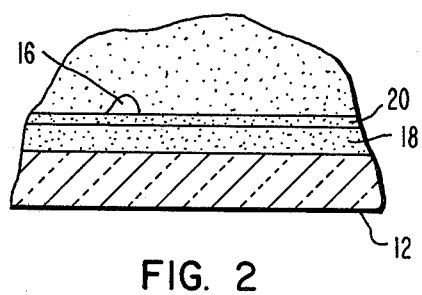
FIG. 2 is an enlarged fragmentary sectional view of a portion of the lamp envelope as shown in FIG. 1 illustrating the phosphor layers in greater detail.

The lamp as shown in FIG. 1 prevents the foregoing color shifts which may be encountered with the single layer, three-component blend. The lamp is fabricated to have a predetermined correlated color temperature, as determined primarily by the relative proportions of the components comprising the blend of the phosphor layer 18. This first phosphor layer 18 is applied to such thickness that the coating weight thereof falls within the range of from 2.3 mg/cm$^2$ to 5.5 mg/cm$^2$. In a 40WT12 bulb this constitutes from about 3 grams to about 7 grams of phosphor. This first applied layer, when excited by the discharge of the lamp, will have a composite emission response which falls approximately within a predetermined color ellipse on the x-y chromaticity diagram of the ICI system. There is then applied over the first phosphor layer 18 a relatively thin layer 20 of stable, finely divided phosphor means which, when excited by the discharge of the lamp, has an emission of predetermined x-y coordinates which substantially correspond to the predetermined x-y coordinates of the composite emission of the first layer. The second applied phosphor layer 20 is quite thin so that its emission contribution is minimized, and the coating weight of the second phosphor layer falls within the range of from 0.23 mg/cm$^2$ to 0.7 mg/cm$^2$. In a 40WT12 bulb this constitutes from about 0.3 gram to about 0.9 gram of phosphor. Even though this layer 20 is quite thin so that its emission contribution is minimized, it nevertheless effects a protective screening for the zinc silicate component of the layer 18, so that the composite emission of the blend remains stable throughout prolonged lamp operation. The double phosphor coating is shown in greater detail in the enlarged view of FIG. 2, wherein the three-component blend phosphor layer 18 which is coated onto the interior surface of the envelope 12 is shown as relatively thick as compared to the thin protective phosphor overlayer 20. Application of the double phosphor coatings 18 and 20 to the interior surface of the envelope 12 is generally conventional using a double coating procedure wherein the coatings are individually applied in sequence. Details for coating techniques are described in U.S. Pat. No. 3,832,199 dated Aug. 24, 1974 to Repsher et al. and U.S. Pat. No. 3,833,392 dated Sept. 3, 1974 to Repsher et al.

Figure 3:
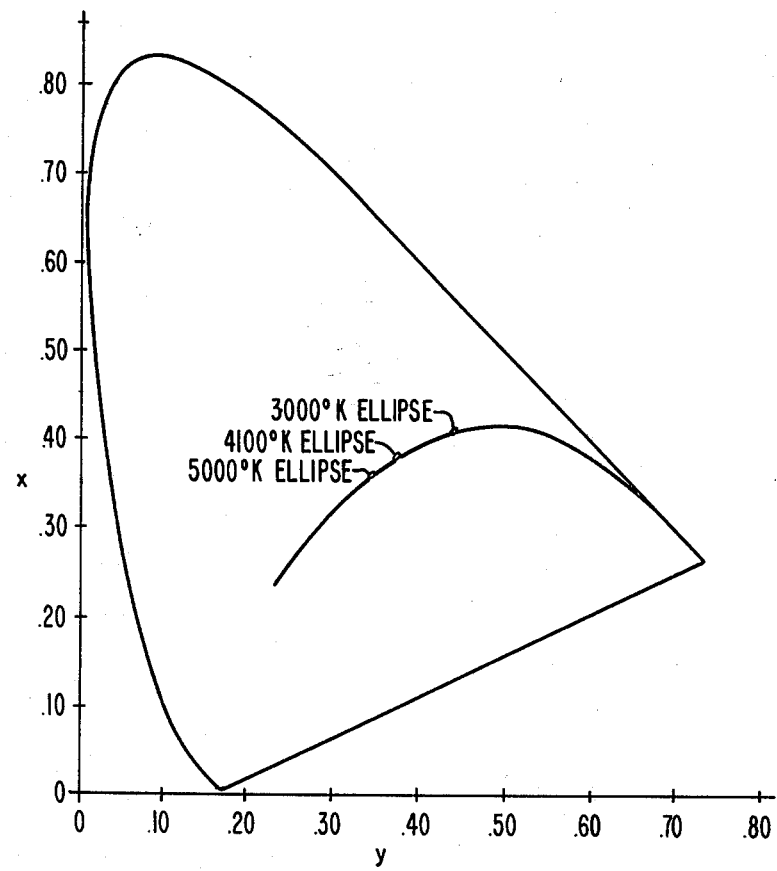
FIG. 3 is a reproduction of the x-y chromaticity diagram of the ICI system having selected color ellipses inscribed thereon.

The preferred coating weight for the second or protective, screening layer 20 is from about 0.4 gm/cm$^2$ to 0.55 gm/cm$^2$. In a forty watt lamp this is equivalent to from about 0.5 gram to about 0.7 gram coated onto a 40WT12 bulb. In FIG. 3 is shown the x-y chromaticity diagram of the ICI system and there are inscribed thereon the color ellipse limitations for a lamp having a correlated color temperature of 3000° K., a lamp having a correlated color temperature of 4100° K., and a lamp having a correlated color temperature of 5000° K. Also inscribed on this x-y chromaticity diagram is the so-called black body line.

Considering specific examples, to fabricate a 3000° K. lamp, the components comprising the first phosphor layer 18 are mixed in the relative proportions of 72% by weight yttrium oxide phosphor as described hereinbefore, 24% by weight zinc silicate as described hereinbefore and 4% by weight strontium chloroapatite as described hereinbefore. Coated thereover as the layer 20 is a very thin layer of the blend of yellow halophosphate and trivalent-europium-activated yttrium oxide as described in the previously referenced copending Application Ser. No. 058,574, filed July 17, 1979, now U.S. Pat. No. 4,263,530. More specifically, the yttrium oxide is identical to the red-orange emitting component of the first layer 18 as described hereinbefore and the halophosphate constituent of the blend comprising the layer 20 is apatite-structured calcium fluorophosphate phosphor activated by from 0.4 to 1% by weight antimony and from 1 to 1.5% by weight manganese. These two constituents are mixed in the weight proportions of about 79% by weight halophosphate and 21% by weight yttrium oxide, in order to provide a composite emission having x-y coordinates which substantially correspond to the x-y coordinates of the emission of the first phosphor layer, although the spectral power distributions of the phosphor layers 18 and 20 are considerably different.

Figure 4:
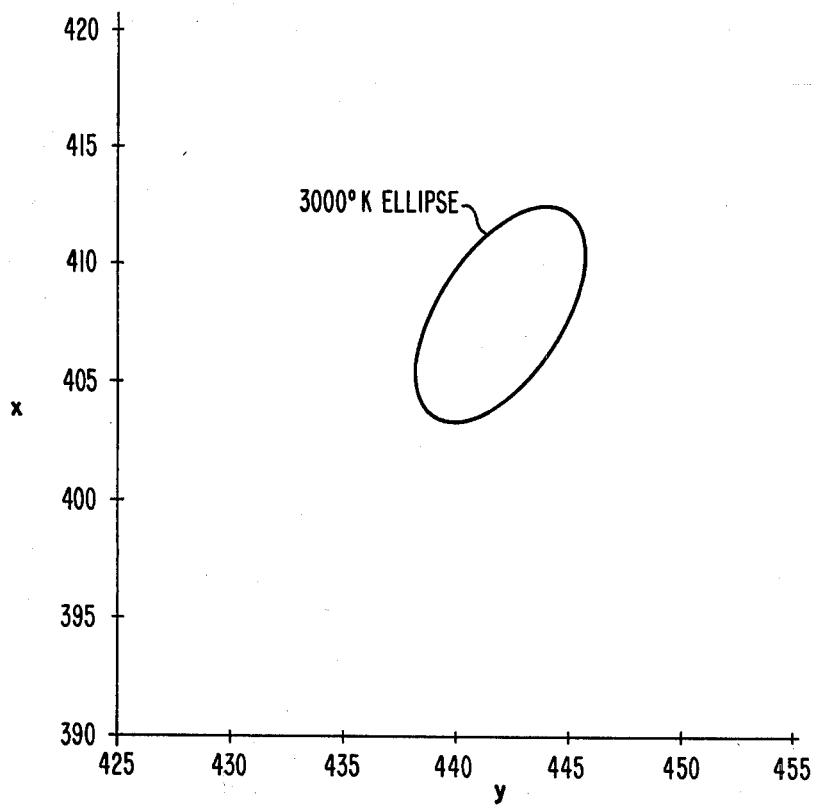
FIG. 4 is an enlarged showing of a portion of the ICI diagram which has inscribed thereon the so-called warm-white ellipse which describes the limits for the ICI coordinates for a lamp having a correlated color temperature of 3000° K.

In actual performance tests of the 3000° K. lamp, the luminous output of the present double-coated lamps increased about 2%, as compared to lamps using a single coating comprising the three-component blend. The color rendering index of the present double-coated lamps measured approximately 87, as contrasted to a color-rendering index which averaged 82 for the lamps utilizing the single layer of the three-component blend. The color preference index for the lamps utilizing only the single layer of the three-component blend normally averages 113 to 114 and this dropped to about 100 for lamps using the present double coating as described hereinbefore. More important, in prolonged tests the extremely thin overcoat of the phosphor layer 20 effectively screens and protects the zinc silicate phosphor of the three-component blend so that the phosphor performs in a very satisfactory fashion and the tendency for pink end formation is substantially eliminated. The color ellipse setting forth the limits for the x-y coordinates for a lamp having a CCT of 3000° K. is shown in enlarged view in FIG. 4.

Figure 5:
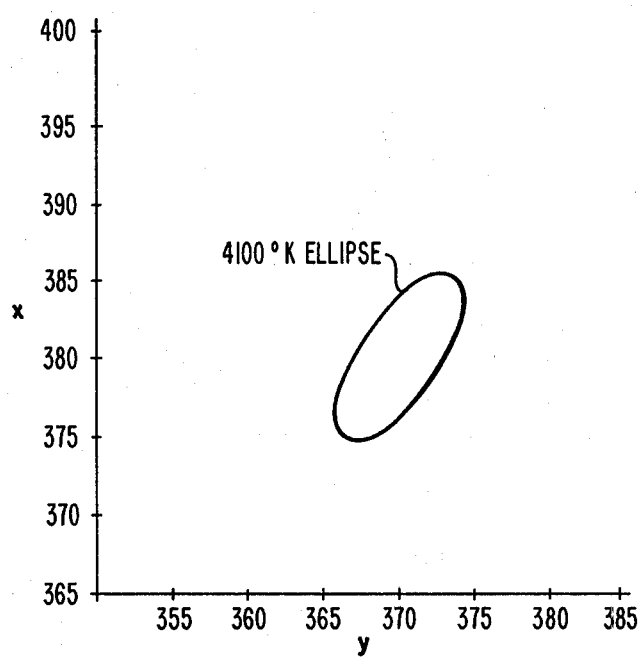
FIG. 5 is an enlarged showing generally corresponding to FIG. 4 but showing the so-called cool-white ellipse which describes the limits for a lamp having a correlated color temperature of 4100° K.

As a second example, in order to provide a lamp having a correlated color temperature of 4100° K., the yttrium oxide, zinc silicate and strontium chloroapatite components comprising the layer 18 are mixed in the approximate weight ratios of 53:32:15. To provide the screening effects, there is applied thereover to the coating weights as previously described a thin layer of cool-white halophosphate which is calcium fluorochlorophosphate activated with from 0.5 to 0.9% by weight antimony and 0.79% by weight manganese. This layer 20 is applied as in the previous example to a coating weight of from 0.23 mg/cm$^2$ to 0.7 mg/cm$^2$. The color ellipse setting forth the limits for the x-y coordinates for a lamp having a CCT of 4100° K. is shown in enlarged view in FIG. 5.

As another example of a 4100° K. phosphor blend which can be used as the thin, screening layer 20, finely divided bluish-white, apatite-structured, calcium fluorochlorophosphate activated by antimony and manganese can be mixed with finely divided yttrium oxide activated by trivalent europium, as described hereinbefore. The weight ratio of these mixed phosphors should be about 88 parts halophosphate and about 12 parts yttrium oxide to provide the desired 4100° K. color temperature. As is known, this halophosphate phosphor is activated by from 0.5 to 0.9 wt. % antimony and about 0.43 wt. % manganese.

Figure 6:
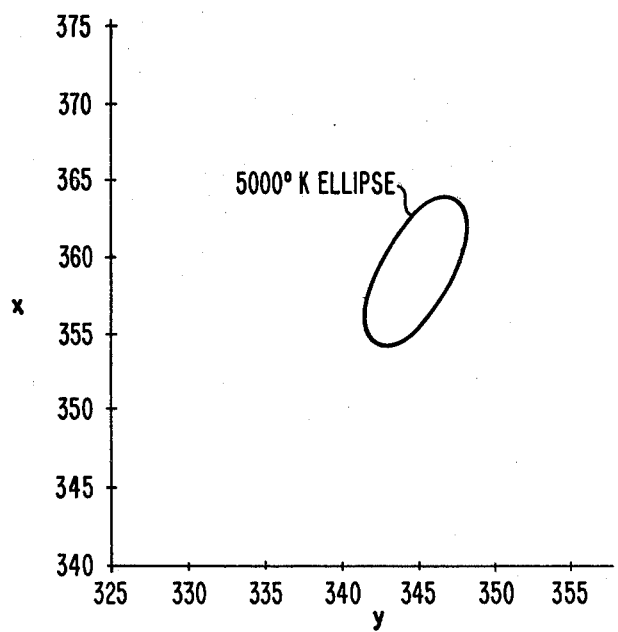
FIG. 6 is an enlarged showing of a portion of the ICI diagram showing the limits for the ICI coordinates for a lamp having a correlated color temperature of 5000° K.

As a third example, a mixture of 50% by weight yttrium oxide, 35% by weight zinc silicate and 15% by weight strontium chloroapatite will provide the blend comprising the layer 18 with an emission having a correlated color temperatures of approximately 5000° K. To provide the thin protective overlayer with similar emission coordinates, 93% by weight of bluish-white halophosphate can be mixed with 7% by weight of the trivalent-europium-activated yttrium oxide, coated to a weight as previously described. Bluish-white halophosphate is well known and can be described as calcium fluorochlorophosphate activated by from 0.5 to 9% by weight antimony and 0.43% by weight manganese. The resulting lamps have a color preference index of 102. The color ellipse setting forth the limits for the x-y coordinates for a lamp having a CCT of 5000° K. is shown in enlarged view in FIG. 6.

All of the foregoing examples have used a thin protective phosphor overcoat 20 which is less expensive than the primary phosphor layer 18, in order to effect a screening and protection for the zinc silicate phosphor component of the three-component blend. The screening can also be provided by using a three-component blend as described in the aforementioned U.S. Pat. No. 3,937,998. The preferred blend of this Verstegen et al patent is barium magnesium aluminate activated by europium (Ba$_{0.86}$Mg$_2$Al$_{16}$O$_{27}$:0.24Eu) as the blue-emitting component, magnesium aluminate, activated by cerium and terbium (MgAl$_{11}$O$_{19}$:0.67Ce, 0.33Tb) as the green-emitting component, and the aforementioned yttrium oxide activated by trivalent europium as the red-emitting component, with the components mixed in the predetermined proportions as required to provide the predetermined desired emission color for the blend. The luminous output of this phosphor blend is good and while the color preference index of the lamps using this blend as a protective layer 20 is decreased compared to the lamps incorporating only the blend of the layer 18, the green-emitting component of the blend 18 is not subject to attack which can affect its output. This foregoing phosphor blend of the Verstegen patent is also very expensive. By using this blend as the very thin overlayer 20, however, only a very small amount of this very expensive material is needed. The composite double layer lamps have good luminous output and good color rendering properties. In this manner the outstanding performance for the high-performance three-component blend comprising the layer 18 is substantially unaltered, with the expensive blend of the layer 20 effecting the screening protection of the zinc silicate. As an alternative embodiment, the divalent europium-activated strontium chlorophosphate can be substituted for the preferred blue-emitting phosphor component in the three component blend as described in U.S. Pat. No. 3,937,998, and this modified blend used as the thin protective overcoat 20. Thus the three-component blend of this patent when used as the protective overcoat will comprise the aforementioned yttrium oxide activated by trivalent europium as the red-emitting component, magnesium aluminate activated by cerium and terbium as the green-emitting component and a divalent-europium-activated phosphor as the blue-emitting component, with the relative proportions of the three components varied to provide a correlated color temperature which corresponds to the correlated color temperature of the primary phosphor layer 18 which is being protected. Specific examples for blends of varying correlated color temperatures are described in the aforementioned U.S. Pat. No. 3,937,998.

The emission color of the three-component blend comprising the layer 18 can be varied over a wide range by controlling the relative amounts of the individual phosphor component. The color temperature of the thin protective phosphor overlay 20 can also be preselected by choosing the individual components. For example, while one specific example has been given hereinbefore for a 5000° K. overlay, such a color temperature can also be obtained by mixing 25% by weight blue halophosphate and 75% by weight of the calcium fluorophosphate.

We claim:
1. A fluorescent lamp having a predetermined correlated color temperature as defined by x-y coordinates as inscribed on the x-y chromaticity diagram of the ICI system together with combined high efficacy and good color rendition, said lamp comprising a sealed elongated light-transmitting envelope having electrodes operatively positioned therein proximate the ends thereof and enclosing a discharge-sustaining filling comprising mercury and a small charge of inert ionizable starting gas which when energized generates a discharge comprising ultraviolet radiations and a limited proportion of visible radiations, phosphor means comprising a predetermined amount of a first phosphor layer carried on the inner surface of said envelope and a predetermined amount of a second phosphor layer coated on and carried on said first phosphor layer so that said second phosphor layer is positioned nearest to said discharge:
   a. said first phosphor layer principally comprising a mixture of predetermined amounts and relative proportions of narrow-band blue-emitting phos- phor having an emission substantially confined to the wavelength range of from 430 nm to 485 nm, green-emitting phosphor having an emission substantially confined to the wavelength range of from 515 nm to 570 nm, and red-orange-emitting phosphor having an emission substantially confined to the wavelength range of from 588 nm to 630 nm, and the predetermined amounts and relative proportions of said mixed phosphors comprising said first phosphor layer being such that the composite emission response from said first phosphor layer when excited by said discharge falls approximately within a predetermined color ellipse on the x-y chromaticity diagram of the ICI system, portions of said green-emitting phosphor component of said first phosphor layer if directly exposed to said discharge displaying a maintenance of light emission during lamp operation which is inferior to the maintenance of light emission displayed by said blue-emitting phosphor component and said red-orange-emitting phosphor component of said first phosphor layer, and the coating weight of said first phosphor layer falling within the range of from 2.3 mg/cm$^2$ to 5.5 mg/cm$^2$;

b. said second phosphor layer principally comprising a relatively thin layer of stable finely divided phosphor means which when excited by said discharge has an emission of predetermined x-y coordinates which substantially correspond to said predetermined x-y coordinates of the composite emission of said first phosphor layer, and the coating weight of said second phosphor layer falling within the range of from 0.23 mg/cm$^2$ to 0.7 mg/cm$^2$; and c. said composite emissions of said first phosphor layer and said second phosphor layer coupled with the limited proportion of visible radiations generated by said discharge causing the total visible emissions from said energized lamp to have predetermined x-y coordinates which fall within said predetermined color ellipse as inscribed on the x-y chromaticity diagram of the ICI system; whereby said second thin phosphor layer screens said said green-emitting phosphor component from direct exposure to said discharge.

2. A fluorescent lamp having a predetermined correlated color temperature as defined by x-y coordinates as inscribed on the x-y chromaticity diagram of the ICI system together with combined high efficacy and good color rendition, said lamp comprising a sealed elongated light-transmitting envelope having electrodes operatively positioned therein proximate the ends thereof and enclosing a discharge-sustaining filling comprising mercury and a small charge of inert ionizable starting gas which when energized generates a discharge comprising ultraviolet radiations and a limited proportion of visible radiations, phosphor means comprising a predetermined amount of a first phosphor layer carried on the inner surface of said envelope and a predetermined amount of a second phosphor layer coated on and carried on said first phosphor layer so that said second phosphor layer is positioned nearest to said discharge:

a. said first phosphor layer principally comprising a mixture of predetermined amounts and relative proportions of narrow-band blue-emitting phosphor activated by divalent europium having an emission substantially confined to the wavelength range of from 430 nm to 485 nm, green-emitting manganese-activated zinc silicate phosphor having an emission substantially confined to the wavelength range of from 515 nm to 570 nm, and red-orange-emitting trivalent europium-activated yttrium oxide phosphor having an emission substantially confined to the wavelength range of from 588 nm to 630 nm, and the predetermined amounts and relative proportions of said mixed phosphors comprising said first phosphor layer being such that the composite emission response from said first phosphor layer when excited by said discharge falls approximately within a predetermined color ellipse on the x-y chromaticity diagram of the ICI system, and the coating weight of said first phosphor layer falling within the range of from 2.3 mg/cm$^2$ to 5.5 mg/cm$^2$;

b. said second phosphor layer principally comprising a relatively thin layer of stable finely divided phosphor means which when excited by said discharge has an emission of predetermined x-y coordinates which substantially correspond to said predetermined x-y coordinates of the composite emission of said first phosphor layer, and the coating weight of said second phosphor layer falling within the range of from 0.23 mg/cm$^2$ to 0.7 mg/cm$^2$; and c. said composite emissions of said first phosphor layer and said second phosphor layer coupled with the limited proportion of visible radiations generated by said discharge causing the total visible emissions from said energized lamp to have predetermined x-y coordinates which fall within said predetermined color ellipse as inscribed on the x-y chromaticity diagram of the ICI system.

3. The lamp as specified in claim 2, wherein said second phosphor is coated to a weight of from about 0.4 mg/cm$^2$ to about 0.55 mg/cm$^2$.

4. The fluorescent lamp as specified in claim 2, wherein said narrow-band blue-emitting phosphor of said first phosphor layer is apatite-structure europium-activated strontium chlorophosphate.

5. The fluorescent lamp as specified in claim 4, wherein said lamp has correlated color temperature of about 3000° K., said second phosphor layer is a mixture of finely divided apatite-structured calcium fluorophosphate matrix activated by from 0.4 to 1 weight percent antimony and from 1 to 1.5 weight percent manganese, and yttrium oxide matrix activated by from 2 to 13 weight percent trivalent europium, with the weight ratio of said calcium fluorophosphate phosphor to said yttrium oxide phosphor of said second phosphor layer being about 79:21, and the relative weight ratios of said red-orange emitting phosphor to said green-emitting phosphor to said blue-emitting phosphor in said first phosphor layer respectively being about 72:24:4.

6. The fluorescent lamp as specified in claim 4, wherein said lamp has a correlated color temperature of about 4100° K., said second phosphor layer is a mixture of finely divided bluish-white apatite-structured calcium fluorochlorophosphate activated by antimony and manganese and yttrium oxide activated by from 2 to 13 wt. % trivalent europium, with the weight ratio of said calcium fluorochlorophosphate to said yttrium oxide phosphor in said second phosphor layer being about 88:12, and the relative weight ratio of said red-orange-emitting phosphor to said green-emitting phosphor to said blue-emitting phosphor in said phosphor layer is about 53:32:15.

7. The fluorescent lamp as specified in claim 4, wherein said lamp has a correlated color temperature of about 5000° K., said second phosphor layer is a mixture of finely divided bluish-white apatite-structured calcium fluorochlorophosphate activated by antimony and manganese and yttrium oxide activated by from 2 to 13 wt. % trivalent europium, with the weight ratio of said calcium fluorochlorophosphate to said yttrium oxide phosphor in said second phosphor layer being about 93:7, and the relative weight ratio of said red-orange-emitting phosphor to said green-emitting phosphor to said blue-emitting phosphor in said first phosphor layer is about 50:35:15.

8. The fluorescent lamp as specified in claim 4, wherein said second phosphor layer is a mixture of red-emitting yttrium oxide activated by trivalent europium, green-emitting magnesium aluminate activated by cerium and terbium, and divalent-europium-activated blue-emitting phosphor, with the relative proportions of the components of said second layer being predetermined to provide an emission color substantially corresponding to the emission color of said first phosphor layer.

* * * * *